United States Patent [19]

Khoe et al.

[11] Patent Number: 4,464,012
[45] Date of Patent: Aug. 7, 1984

[54] BROAD-BAND COMMUNICATION SYSTEM COMPRISING AN OPTICAL BROAD-BAND CABLE NETWORK

[75] Inventors: Giok D. Khoe, Eindhoven, Netherlands; Friedrich Krahn, Bergisch Gladbach, Fed. Rep. of Germany

[73] Assignee: U.S. Philips Corporation, New York, N.Y.

[21] Appl. No.: 377,631

[22] Filed: May 12, 1982

[30] Foreign Application Priority Data

May 26, 1981 [NL] Netherlands .......................... 8102573

[51] Int. Cl.³ ................................................. G02B 5/16
[52] U.S. Cl. ............................... 350/96.16; 350/96.24; 455/612
[58] Field of Search ............... 350/96.16, 96.22, 96.24; 455/612

[56] References Cited

U.S. PATENT DOCUMENTS

| 4,105,285 | 8/1978 | Bedgood et al. | 350/96.21 |
| 4,165,225 | 8/1979 | Auracher et al. | 350/96.15 |
| 4,172,631 | 10/1979 | Yevick | 350/96.15 |
| 4,232,385 | 11/1980 | Hara et al. | 350/96.15 |

FOREIGN PATENT DOCUMENTS

| 2324577 | 12/1974 | Fed. Rep. of Germany | 350/96.22 |
| 2818656 | 10/1979 | Fed. Rep. of Germany | 350/96.22 |
| 53-35402 | 1/1978 | Japan | 455/612 |
| 57-35253 | 2/1982 | Japan | 350/96.24 |
| 57-158810 | 9/1982 | Japan | 350/96.24 |

*Primary Examiner*—John D. Lee
*Assistant Examiner*—Brian M. Healy
*Attorney, Agent, or Firm*—Marc D. Schechter

[57] ABSTRACT

Broad-band communication system comprising a broad-band cable network arranged between an exchange and a large plurality of subscriber's stations. The network is formed by optical fibers. In order to avoid extra attenuation caused by splices, the incoming bundles of individual cables are, split at branching points, without splicing, into a number of separate outgoing bundles of individual cables.

4 Claims, 3 Drawing Figures

BROAD-BAND COMMUNICATION SYSTEM COMPRISING AN OPTICAL BROAD-BAND CABLE NETWORK

BACKGROUND OF THE INVENTION

The invention relates to a broad-band communication system comprising an optical broad-band cable network arranged between an exchange and a plurality of subscribers stations. The system comprises optical fibers which starting from the exchange and traveling towards the subscriber's stations, are combined in ever smaller bundles. Eventually, the bundles only incorporate the optical fibers intended for the connection to a single subscriber's station. Each bundle from the exchange is split at branching points into two or more individual outgoing bundles.

Such a broad-band communication system is disclosed in German Offenlegungsschrift No. 2818656. In this system, the bundles are split into smaller bundles in splicing sleeves.

In a local distribution network, bundles will be split in a cabinet or in a sleeve at many places along the path between the exchange and the subscriber station. When splicing optical cables, a given attenuation factor is produced per splice. This factor may be, for example, 0.5 dB. If, for example, a splice has to be made every 300 meters on the average, then along a path of, for example 4 km, 7 dB extra attenuation is caused by the splices. In addition, splicing large numbers of optical fibers is very time-consuming and expensive.

SUMMARY OF THE INVENTION

It is an object of the invention to provide a broad-band communication system of the type described above which has a lower attenuation.

According to the invention, in a broad-band communication system each bundle of optical fibers consists of a plurality of individual cables extending in the same direction. At two or more consecutive branching points an incoming bundle of individual cables is branched without splicing into at least two separate outgoing bundles of separate cables. These separate bundles go in different directions.

With a cable length of 1 km and an average of one branching point every 300 m this results in an improvement of 1 dB/km and realises a savings of many splices.

At a cable length of 1.5 km an average of 2 dB/km is saved. By way of comparison, it should be noted that an attenuation of an optical fiber in the 1300 nm window of 0.8 dB/km is now possible, so that 2 dB corresponds to the attenuation of a cable having a length of 2.5 km.

DESCRIPTION OF THE PREFERRED EMBODIMENTS

Figure 1:
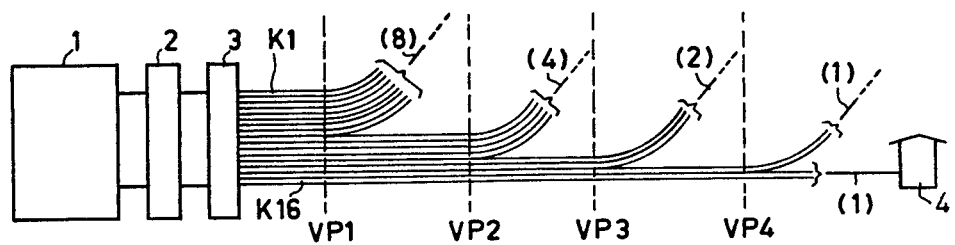
FIG. 1 schematically shows a first embodiment of a distribution network according to the invention.

In FIG. 1, reference numeral 1 denotes an exchange from which broad-band signals are to be distributed to a large number of subscribers' stations 4. Reference numeral 2 denotes an optical main distributor which is the equivalent of the conventional main distributor in present telephone exchanges. Reference numeral 3 denotes a distributing sleeve in which the optical fibers are distributed into a number of optical cables, for example, 16 cables K1–K16 in this example.

Each cable in this example comprises a connecting means for one subscriber's station, for example a set of two fibers. The cables extend from the distributing sleeve 3 to the subscribers' stations 4, as far as possible without splices. On their way the cables follow as far as possible the same route. The incoming bundle of individual cables is branched without splices at a number of branching points VP1, VP2, VP3 and VP4 into a number of separate outgoing bundles of individual cables, the outgoing bundles going in different directions. Branching, in this example is effected, at each branching point is into two outgoing bundles. Branching at a branching point is performed by simply bending incoming cables to cause them to emerge from the branching point in different directions. The figures in brackets in FIG. 1 indicate the number of connecting means in a bundle.

Figure 2:
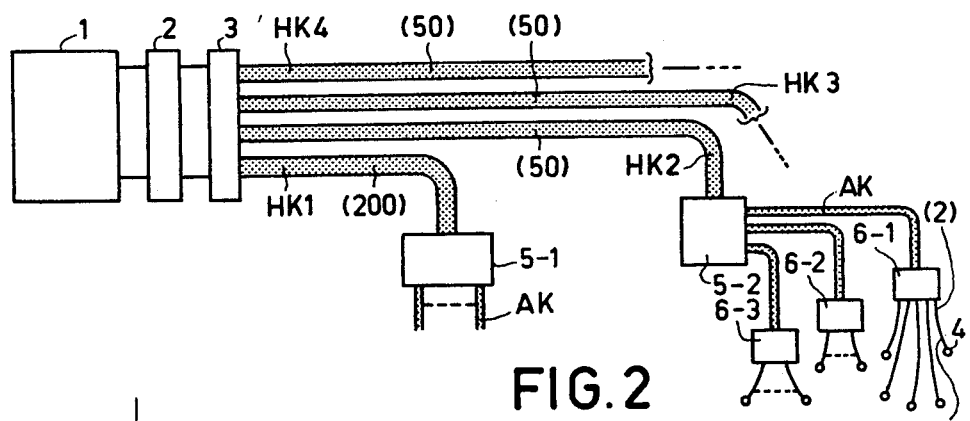
FIG. 2 schematically shows a second embodiment of a distribution network according to the invention.

In the example shown in FIG. 2 a number of cable bundles HK1, HK2, HK3 and HK4 are passed, as far as possible, from the distributing sleeve 3 directly to a number of optical cable splitters 5-1, 5-2, and so on. The branched-off bundles AK extend from the optical cable splitters directly to the optical end-splitters 6-1, 6-2, 6-3, and so on. The figures in brackets in FIG. 2 indicate the number of fibers in a bundle, assuming that a connecting means for a subscriber's station comprises two fibers.

From the optical end-splitters, the single cables EK, which each comprise a connecting means, extend to the subscribers' stations. In principle, the same procedure is followed at the cable splitters and end-splitters as at the branching points of FIG. 1, that is to say that the direction of an incoming cable is changed without splicing by bending the cable.

Figure 3:
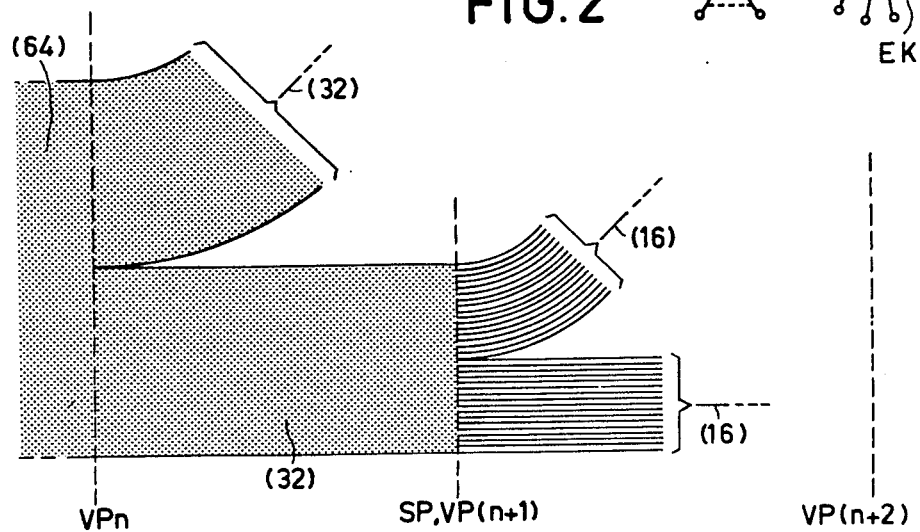
FIG. 3 schematically shows a splicing point in a distribution network according to the invention.

When the length of the path from the exchange to the subscribers' stations exceeds the maximum cable length, then a splicing point is required somewhere in the path. If a splicing point SP (FIG. 3) is necessary, then it is advantageous to combine it with a branching point. In this example, the branching point VP (n+1) is located between the branching points VPn and VP(n+2). It is also advantageous to use one type of cable (in the example having 32 connecting means) before the splicing point, and to use a different type of cable (in the example a cable having one connecting means per cable) after the splicing point.

The distribution network between the exchange and the splicing point SP may be of a construction which fully conforms to the principles of FIG. 1 with cables having 32 connecting means per cable. In addition, the same procedure as described with reference to FIG. 1 may be used between the splicing point and the subscribers' stations, in this case using cables having one connecting means per cable.

In one practical example a cable, sequence of the sizes of the cables extending from the exchange to the subscribers in a conventional local distribution network might be: 900-450-150-50-25-12-6-1. The numbers in the sequence are the number of optical fibers required for connecting one subscriber's station.

The path of 900-450-150 may be formed by bundles of individual cables each having 150 units and the path 50-25-12-6 may be formed by bundles of individual cables each having 6 units. The transition from 150 to 50 connecting units per cable and from 6 to 1 connecting units per cable is obtained by splicing. Compared with the conventional local distribution network this results in a saving of 4500 fiber fiber splices, and results in a decrease in attenuation of 2.5 dB.

Underground cables are often damaged during excavations. When a cable comprising, for example, 900 fibers is damaged, it will be obvious that the entire cable cross section must be repared, as the cable has one common armor (sheath). However, in the system according to the invention (having, for example, a bundle of 90 cables each comprising 10 fibers) to repair in the event of cable damage, only the actually damaged cables need be repaired as each one of the 90 cables forms a separate unit. The same applies when a water leak develops. A water leak has much greater consequences for a cable comprising 900 fibers than for a cable comprising only 10 fibers.

What is claimed is:

1. An optical broad-band cable network arranged between an exchange and a plurality of subscribers' stations in a broad-band communication system, said cable network comprising:
    a plurality of optical fibers extending from the exchange to the subscribers' stations, said fibers being arranged in bundles, said bundles having decreasing numbers of fibers as the bundles extend from the exchange to the subscribers' stations; and
    a plurality of branching points at each of which an incoming bundle of fibers is split into two or more separate outgoing bundles of fibers;
    characterized in that:
    each bundle of fibers comprises a plurality of individual optical fiber cables extending in the same direction; and
    at two or more consecutive branching points, from the exchange to the subscribers' stations, an incoming bundle of optical fiber cables is divided without splices into two or more separate outgoing bundles of optical fiber cables, the separate outgoing bundles extending in different directions.

2. A broad-band communication system comprising:
    an exchange;
    a plurality of subscribers' stations;
    a plurality of optical fibers extending from the exchange to the subscribers' stations, said fibers being arranged in bundles, said bundles having decreasing numbers of fibers as the bundles extend from the exchange to the subscribers' stations; and
    a plurality of branching points at each of which an incoming bundle of fibers is split into two or more separate outgoing bundles of fibers;
    characterized in that:
    each bundle of fibers comprises a plurality of individual optical fiber cables extending in the same direction; and
    at two or more consecutive branching points, from the exchange to the subscribers' stations, an incoming bundle of optical fiber cables is divided without splices into two or more separate outgoing bundles of optical fiber cables, the separate outgoing bundles extending in different directions.

3. An optical broad-band cable network arranged between an exchange and a plurality of subscribers' stations in a broad-band communication system, said cable network comprising:
    a plurality of optical fibers extending from the exchange to the subscribers' stations, said fibers being arranged in bundles, said bundles having decreasing numbers of fibers as the bundles extend from the exchange to the subscribers' stations; and
    a plurality of branching points at each of which an incoming bundle of fibers is split into two or more separate outgoing bundles of fibers;
    characterized in that:
    each bundle of fibers comprises a plurality of individual optical fiber cables extending in the same direction;
    at two or more consecutive branching points, from the exchange to the subscribers' stations, an incoming bundle of optical fiber cables is divided without splices into two or more separate outgoing bundles of optical fiber cables, the separate outgoing bundles extending in different directions; and
    at one or more other branching points the fibers of the incoming bundle are spliced in a one-to-one relationship to the fibers of the outgoing bundles.

4. An optical broad-band cable network as claimed in claim 3, characterized in that the outgoing bundles comprise cables of the same type and having the same number of fibers per cable.

* * * * *